No. 770,977. PATENTED SEPT. 27, 1904.
D. W. MARTIN.
NUT LOCK.
APPLICATION FILED APR. 5, 1904.
NO MODEL.
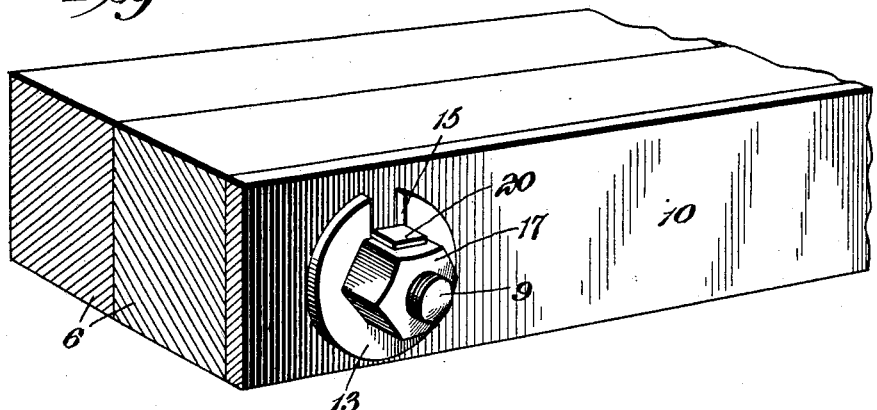
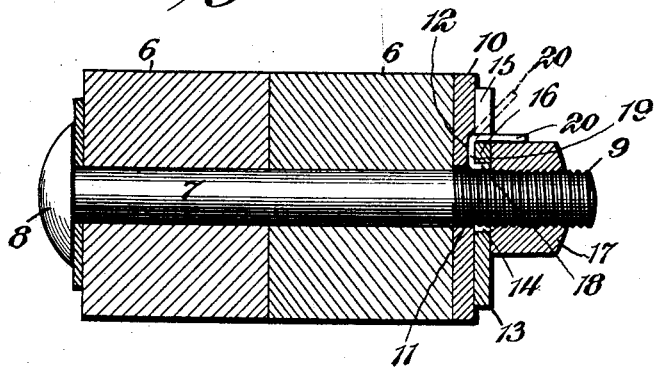
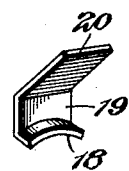
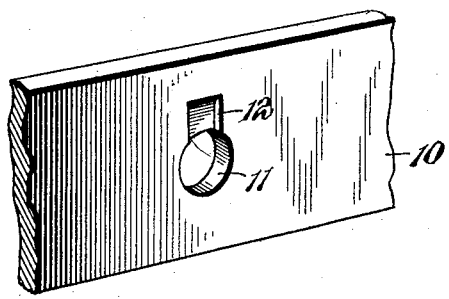
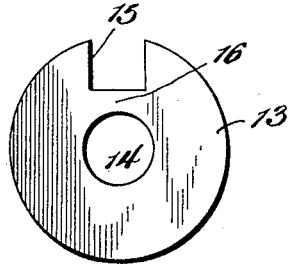
David W. Martin, Inventor,
Witnesses
Howard W. Orr.
B. G. Foster.
By E. G. Siggers
Attorney No. 770,977. Patented September 27, 1904.

UNITED STATES PATENT OFFICE.

DAVID W. MARTIN, OF PORTAGE, PENNSYLVANIA, ASSIGNOR OF ONE-HALF TO EDWARD HOPFEL, OF PORTAGE, PENNSYLVANIA.

NUT-LOCK.

SPECIFICATION forming part of Letters Patent No. 770,977, dated September 27, 1904.

Application filed April 5, 1904. Serial No. 201,682. (No model.)

*To all whom it may concern:*

Be it known that I, DAVID W. MARTIN, a citizen of the United States, residing at Portage, in the county of Cambria and State of Pennsylvania, have invented a new and useful Nut-Lock, of which the following is a specification.

This invention relates to improvements in means for holding nuts against accidental turning on their bolts; and the object is to provide a novel lock of this character that may be readily applied and as readily removed when desired and constitutes efficient holding means to prevent the turning of the nut by the jar, vibration, or other similar cause incident to the use of the structure of which such nut and bolt form a part.

The preferred embodiment of the invention is illustrated in the accompanying drawings, wherein—

Figure 1 is a perspective view showing portions of two members held together by a bolt and nut, the latter being locked by the improved means. Fig. 2 is a sectional view through the same. Fig. 3 is a detail perspective view of the base-plate. Fig. 4 is a perspective view of the locking device. Fig. 5 is a face view of the washer employed.

Similar reference-numerals indicate corresponding parts in all the figures of the drawings.

While the lock is capable of being employed in connection with practically any ordinary form of bolt and in many ways, a simple application of the same is shown in connection with two bars or members, (designated 6.) Through said bars or members is passed an ordinary bolt-shank 7, having a head 8 at one end and a threaded portion 9 at the other which projects beyond the members. A base-plate 10, formed of suitable metal, is provided with an opening 11, that receives the shank of the bolt, and, furthermore, has a socket 12 cut into its outer face and extending from the opening 11. A disk washer 13, having the usual central bolt-receiving opening 14, is placed upon the threaded end 9 of the shank and is provided in one side with a slot 15, the inner edge of which is adapted to overlap the outer end of the socket, as shown in Fig. 2. Said inner end is spaced from the opening 14, leaving a web 16, that extends across and practically covers the socket 12. A nut 17 of any desirable form having angularly-disposed outer faces is screwed upon the threaded end 9 of the shank and bears against the washer 13.

The locking device employed is in the form of a strip constructed of metal that is bendable. This locking device has at its inner end an outturned tongue 18, preferably curved to conform to the shank of the bolt, the length of this tongue being substantially equal to the thickness of the washer. An intermediate portion 19 of the locking device is adapted to be seated in the socket 12 of the base-plate and is held therein by the web 16. The length of this intermediate portion is therefore equal to the width of said web. The outer portion of the locking device is in the form of an outturned tongue 20, considerably longer than the tongue 18, so that it will project through the slot 15 and engage one side of the nut.

In applying the device, the socket 12 having been formed in the base-plate and the inner tongue 18 having been bent up from the strip, the locking device is seated in said socket and the washer placed thereover, after which the nut is screwed home and the tongue 20 then bent outwardly. As a result the locking device embraces a portion of the washer and is held against detachment from the socket 12 by means of the tongue 18 and by the web 16, while not only is the washer secured against rotation, but the nut is in like manner fastened by the tongue 20. The device therefore constitutes an efficient lock for the various parts, holding the same against rotation from any cause, such as vibration or jar of the parts. The nut may be readily removed by bending the tongue 20 outwardly until the side walls of the nut will clear the same, whereupon the entire lock and washer may be removed. It will be apparent that the device can be constructed at small cost and that it may be readily applied to an ordinary bolt.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a nut-lock, the combination with a bolt, of a washer having an opening therethrough that receives the bolt, a locking-strip located beneath the washer and having outturned tongues, one of which is located within the bolt-receiving opening, the other projecting beyond the outer face of the washer and bearing against one side of the nut.

2. In a nut-lock, the combination with a base member having an opening therethrough and a socket extending away from the opening, of a bolt passing through the opening, a washer located on the bolt and fitting over the socket, said washer having a slot in its outer edge, a nut threaded on the bolt, and a locking-strip having a portion seated in the socket and covered by the washer, said strip having a bendable tongue that projects through the slot of the washer and engages the nut.

3. In a nut-lock, the combination with a base-plate having an opening therethrough and a socket in its outer face, of a bolt passing through the base-plate, a washer located on the bolt and covering the socket, said washer having a slot, the inner portion of which alines with the outer end of the socket, a nut threaded on the bolt and bearing against the washer, a locking-strip having one end disposed between the washer and bolt, an intermediate portion seated in the socket and held there by the washer, and an outturned tongue passing through the slot of said washer and engaging one side of the nut.

In testimony that I claim the foregoing as my own I have hereto affixed my signature in the presence of two witnesses.

DAVID W. MARTIN.

Witnesses:
JOHN W. KEPHART,
GALEN D. KNOWLES.